United States Patent
Sato et al.

(10) Patent No.: US 12,540,740 B2
(45) Date of Patent: Feb. 3, 2026

(54) AIR CONDITIONER, CONTROL METHOD, AND NON-TRANSITORY COMPUTER-READABLE RECORDING MEDIUM

(71) Applicant: Mitsubishi Electric Corporation, Tokyo (JP)

(72) Inventors: Masakazu Sato, Tokyo (JP); Yoshiyuki Tada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 208 days.

(21) Appl. No.: 18/553,502

(22) PCT Filed: May 25, 2022

(86) PCT No.: PCT/JP2022/021357
§ 371 (c)(1),
(2) Date: Sep. 29, 2023

(87) PCT Pub. No.: WO2023/067839
PCT Pub. Date: Apr. 27, 2023

(65) Prior Publication Data
US 2024/0240806 A1    Jul. 18, 2024

(30) Foreign Application Priority Data
Oct. 21, 2021  (WO) .................. PCT/JP2021/038883

(51) Int. Cl.
*F25B 31/00*       (2006.01)
*F24F 1/32*        (2011.01)
(Continued)

(52) U.S. Cl.
CPC .............. *F24F 1/32* (2013.01); *F25B 31/004* (2013.01); *F25B 41/40* (2021.01); *F25B 49/022* (2013.01);
(Continued)

(58) Field of Classification Search
None
See application file for complete search history.

(56) References Cited

U.S. PATENT DOCUMENTS

2008/0134701 A1* 6/2008 Christensen .......... F25B 31/002
                                                    417/42
2018/0073786 A1  3/2018 Ote

FOREIGN PATENT DOCUMENTS

CN        106247686 A    12/2016
JP        S63-116056 A    5/1988
(Continued)

OTHER PUBLICATIONS

Office Action mailed Jan. 23, 2024 in corresponding Japanese Patent Application No. 2023-554245 (and English machine translation).
(Continued)

*Primary Examiner* — Jerry-Daryl Fletcher
*Assistant Examiner* — Daniel C Comings
(74) *Attorney, Agent, or Firm* — Posz Law Group, PLC

(57) ABSTRACT

An air conditioner has a refrigeration cycle in which a refrigerant circulates through a compressor, an indoor heat exchanger, an expansion valve, and an outdoor heat exchanger which are connected by pipes. The air conditioner includes: an operation frequency detector configured to detect an operation frequency of the compressor; an operation time measurer configured to, based on the operation frequency, measure a continuous time for which a low frequency operation in which the operation frequency of the compressor is equal to or lower than a reference frequency is continuously performed; a stop counter configured to, based on the continuous time, count a stop number of times the compressor is stopped without the continuous time continuing longer than a reference time; and an operation controller configured to, based on the stop number of times,
(Continued)

perform a recovery operation that recovers a concentration of a refrigerating machine oil sealed inside the compressor.

17 Claims, 7 Drawing Sheets

(51) Int. Cl.
    *F25B 41/40*     (2021.01)
    *F25B 49/02*     (2006.01)

(52) U.S. Cl.
    CPC ....... *F25B 2500/16* (2013.01); *F25B 2600/01* (2013.01); *F25B 2600/02* (2013.01)

(56) References Cited

FOREIGN PATENT DOCUMENTS

| | | |
|---|---|---|
| JP | H04-158149 A | 6/1992 |
| JP | H05-322325 A | 12/1993 |
| JP | 2016-194389 A | 11/2016 |
| JP | 2018-204928 A | 12/2018 |
| JP | 2020-193746 A | 12/2020 |
| WO | 2017/006452 A1 | 1/2017 |
| WO | WO-2020174677 A1 * | 9/2020 .............. F25B 9/006 |

OTHER PUBLICATIONS

International Search Report of the International Searching Authority mailed Aug. 2, 2022 for the corresponding International Application No. PCT/JP2022/021357 (and English translation).
Office Action issued Oct. 27, 2025 in corresponding Turkish patent application No. 2023/015199 (and English translation).

\* cited by examiner

AIR CONDITIONER, CONTROL METHOD, AND NON-TRANSITORY COMPUTER-READABLE RECORDING MEDIUM

CROSS REFERENCE TO RELATED APPLICATION

This application is a U.S. national stage application of International Application No. PCT/JP2022/021357, filed on May 25, 2022, which claims priority based on International Application No. PCT/JP2021/038883 filed on Oct. 21, 2021, the contents of which are incorporated herein.

TECHNICAL FIELD

The present disclosure relates to an air conditioner, a control method, and a non-transitory computer-readable recording medium.

BACKGROUND

There are air conditioners that use a refrigeration cycle (heat pump cycle). Such an air conditioner is configured to operate a compressor to circulate a refrigerant within the cycle. A refrigerating machine oil for lubrication is sealed inside the compressor to smooth a movement of operating members.

While the compressor is operating, some of the refrigerating machine oil flows out of the compressor along with the refrigerant. The refrigerating machine oil that has flown out of the compressor circulates through the cycle and then returns to the compressor. When an operation frequency of the compressor (hereinafter referred to as compressor frequency) is low and a flow velocity of the refrigerant in a refrigerant pipe is low, a time required for the refrigerating machine oil that has flowed out of the compressor to return to the compressor (hereinafter referred to as oil return time) becomes longer and an oil return performance deteriorates.

The compressor frequency usually increases when a temperature difference between a room temperature and a set temperature is large, and decreases as the room temperature approaches the set temperature and the temperature difference becomes smaller. Further, an operating range is set for the compressor frequency, and particularly, the lowest frequency is set as a lower limit of the compressor frequency. Further, even when an operation is performed at the lowest frequency, if the cooling or heating capacity becomes excessive and the room temperature becomes colder or warmer than the set temperature, the compressor will stop operating (thermo-off). After the compressor is stopped due to the thermo-off, the compressor is configured to be not restarted for a predetermined period of time (approximately 3 minutes) to ensure a reliability.

If the operation continues for a long time in a state where the temperature difference between the room temperature and the set temperature is small and the compressor frequency is low (close to the lowest frequency), there is a risk that the compressor will run out of the refrigerating machine oil. For this reason, in conventional air conditioners, if the operation at the low compressor frequency continues for a long time, a control of temporarily increasing the lowest frequency of the compressor and shortening the refrigerating machine oil return time is performed to improve the oil return performance.

Patent Document 1 discloses a technology related to an air conditioner that performs a lowest frequency increase control that temporarily increases the lowest frequency of the compressor when the operation continues for a certain period of time in a state where the operation frequency of the compressor is equal to or lower than a predetermined frequency. In Patent Document 1, simultaneously with the start of the lowest frequency increase control, a thermo-off condition is changed to a condition such that the thermo-off is less likely to occur than under the normal thermo-off condition. As a result, it is possible to suppress frequent occurrence of the thermo-off, and ensure the reliability and comfort of the air conditioner.

PATENT DOCUMENT

[Patent Document 1] Japanese Patent Application Publication No. 2020-193746

However, even if the operation at the low compressor frequency does not continue for a long time, there is also the risk that the compressor will run out of the refrigerating machine oil. Specifically, if an intermittent operation is performed, there is a risk that the refrigerating machine oil will be insufficient. The intermittent operation is an operation in which the short-term start and stop is repeated in the state where the compressor frequency is low.

For example, in a highly airtight or insulated room, even if an operation is performed at a low compressor frequency, the cooling or heating capacity will soon become excessive so that the operation will be stopped. Thereafter, the operation is resumed depending on the temperature difference between the room temperature and the set temperature, but soon the cooling capacity or heating capacity will become excessive again so that the operation will be stopped. Such a short-time operation is performed, thereby performing the intermittent operation.

When the intermittent operation is performed, the refrigerating machine oil return performance deteriorates due to the operation at the low compressor frequency, while a large amount of the refrigerant returns to the compressor. For this reason, an oil concentration decreases, which is a ratio of the refrigerating machine oil contained in the refrigerant inside the compressor. Thereafter, when the compressor starts operating and the temperature of the refrigerant discharged from the compressor increases, the refrigerant dissolved in the refrigerating machine oil evaporates which causes forming, so that a large amount of the refrigerating machine oil flows out along with the evaporated refrigerant. When the intermittent operation is performed, a large amount of the refrigerating machine oil flows out of the compressor in a state where the oil concentration is decreased, resulting in a problem that the refrigerating machine oil runs out so that it becomes difficult to maintain the reliability of the compressor.

SUMMARY

The present disclosure has been made to solve the above problems, and a purpose thereof is to provide an air conditioner, a control method, and a non-transitory computer-readable recording medium, which can perform a control so as to prevent the refrigerating machine oil inside the compressor from running out even when the intermittent operation is performed.

To solve the above problems, an air conditioner according to an aspect of the present disclosure has a refrigeration cycle in which a refrigerant circulates through a compressor, an indoor heat exchanger, an expansion valve, and an outdoor heat exchanger which are connected by a pipe. The air conditioner includes: an operation frequency detector configured to detect an operation frequency of the compressor; an operation time measurer configured to, based on a result of the detection by the operation frequency detector, measure a continuous time for which a low frequency operation in which the operation frequency of the compressor is equal to or lower than a reference frequency is continuously performed; a stop counter configured to, based on a result of the measurement by the operation time measurer, count a stop number of times the compressor is stopped without the continuous time continuing longer than a reference time; and an operation controller configured to, based on the stop number of times, perform a recovery operation that recovers a concentration of a refrigerating machine oil sealed inside the compressor. The operation time measurer is configured to clear the continuous time in a case that an operation that can improve a shortage of the refrigerating machine oil in the compressor is performed in a period from a start of the measurement of the continuous time to the performance of the recovery operation.

To solve the above problems, a control method according to an aspect of the present disclosure is performed by an air conditioner. The control method includes: detecting an operation frequency of a compressor included in the air conditioner; based on a result of detecting the operation frequency, measuring a continuous time for which a low frequency operation in which the operation frequency of the compressor is equal to or lower than a reference frequency is continuously performed; based on a result of measuring the continuous time, counting a stop number of times the compressor is stopped without the continuous time continuing longer than a reference time; based on the stop number of times, performing a recovery operation that recovers a concentration of a refrigerating machine oil sealed inside the compressor; and clearing the continuous time in a case that an operation that can improve a shortage of the refrigerating machine oil in the compressor is performed in a period from a start of the measurement of the continuous time to the performance of the recovery operation.

To solve the above problems, a non-transitory computer-readable recording medium according to an aspect of the present disclosure stores a program causing a control device included in an air conditioner to: detect an operation frequency of a compressor included in the air conditioner; based on a result of detecting the operation frequency, measure a continuous time for which a low frequency operation in which the operation frequency of the compressor is equal to or lower than a reference frequency is continuously performed; based on a result of measuring the continuous time, count a stop number of times the compressor is stopped without the continuous time continuing longer than a reference time; based on the stop number of times, perform a recovery operation that recovers a concentration of a refrigerating machine oil sealed inside the compressor; and clear the continuous time in a case that an operation that can improve a shortage of the refrigerating machine oil in the compressor is performed in a period from a start of the measurement of the continuous time to the performance of the recovery operation.

According to the present disclosure, even when the intermittent operation is performed, it is possible to perform a control so as to prevent the shortage of the refrigerating machine oil inside the compressor.

DETAILED DESCRIPTION

Figure 1:
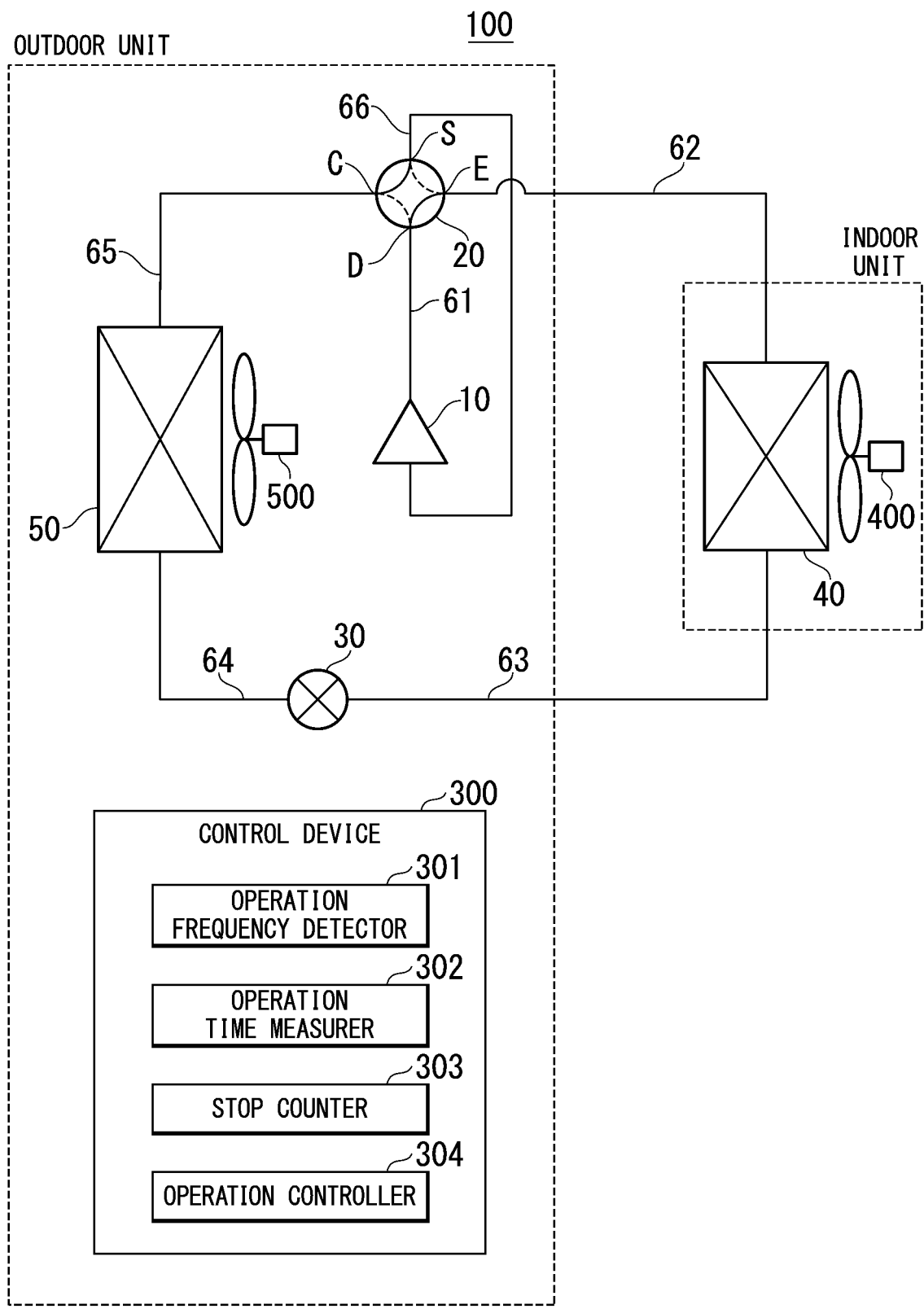
FIG. 1 is a configuration diagram showing an example of an air conditioner according to a first embodiment.

Hereinafter, air conditioners according to embodiments of the present disclosure will be described with reference to the drawings. Hereinafter, devices and the like with the same reference numerals in the entire text of the specification and in each figure indicate the same or equivalent devices. In addition, configurations of components described in the entire specification are merely examples. The present invention is not limited only to the configurations of the components described in the specification.

First Embodiment

FIG. 1 is a configuration diagram showing an example of an air conditioner according to the first embodiment. As shown in FIG. 1, an air conditioner 100 is a separate air conditioner in which an outdoor unit and an indoor unit are connected by refrigerant pipes 6 (refrigerant pipes 61 to 66) or electrical wiring. The outdoor unit houses a compressor 10, a four-way valve 20, an expansion valve 30, an outdoor heat exchanger 50, an outdoor fan 500, and a control device 300. The indoor unit houses an indoor heat exchanger 40 and an indoor fan 400.

The air conditioner 100 is composed of a refrigeration cycle, a blower device, and a control system. In the refrigeration cycle, a circuit is configured in which the compressor 10, the four-way valve 20, the expansion valve 30, the indoor heat exchanger 40, and the outdoor heat exchanger 50 are connected by the refrigerant pipes 6, and a refrigerant is circulated within the circuit. Various refrigerants can be adopted as the refrigerant to be circulated in the refrigeration cycle. Examples of the refrigerants which can be adopted include an HFC refrigerant (chlorofluorocarbon refrigerant) such as an R32 refrigerant, an R125 refrigerant, and an R134a refrigerant, or a mixture of these refrigerants such as an R410A refrigerant, an R407c refrigerant, and an R404A refrigerant. The blower device is composed of the indoor fan 400 and the outdoor fan 500.

The blower device blows air to the heat exchangers. Specifically, the indoor fan 400 send indoor air to the indoor heat exchanger 40. The outdoor fan 500 sends outdoor air to the outdoor heat exchanger 50.

The control system is composed of the control device 300. The control device 300 is a computer. The control device 300 includes a hardware processor such as a CPU (Central Processing Unit), and functions of the control device 300 are realized by the CPU and the like executing a program (software). The control device 300 has functions of controlling circulation of the refrigerant in the refrigeration cycle, air blowing by the blower device, and the like, and performs these functions to control a cooling operation and a heating operation of the air conditioner 100.

The refrigerant pipe 61 connects a discharge side of the compressor 10 and a D port of the four-way valve 20. The refrigerant pipe 62 connects an E port of the four-way valve 20 and the indoor heat exchanger 40. The refrigerant pipe 63 connects the indoor heat exchanger 40 and the expansion valve 30. The refrigerant pipe 64 connects the expansion valve 30 and the outdoor heat exchanger 50. The refrigerant pipe 65 connects the outdoor heat exchanger 50 and a C port of the four-way valve 20. The refrigerant pipe 66 connects an S port of the four-way valve 20 and a suction side of the compressor 10.

The compressor 10 compresses the refrigerant sucked from the refrigerant pipe 66 and discharges the compressed refrigerant to the refrigerant pipe 61. The compressor 10 can be of various types. Examples of the compressor 10 which can be adopted include a rotary type device, a reciprocating type device, a scroll type device, a screw type device, and the like.

The four-way valve 20 is a device that switches between the cooling operation and the heating operation. In the heating operation, as shown by a solid line in FIG. 1, the refrigerant pipe 61 and the refrigerant pipe 62 are connected, and the refrigerant pipe 65 and the refrigerant pipe 66 are connected. In the cooling operation, as shown by a broken line in FIG. 1, the refrigerant pipe 61 connected to the discharge side of the compressor 10 and the refrigerant pipe 65 are connected, and the refrigerant pipe 62 and the refrigerant pipe 66 connected to the suction side of the compressor 10 are connected.

The expansion valve 30 is a device that reduces a pressure of the refrigerant flowing into the expansion valve 30. The expansion valve 30 expands, by reducing the pressure of, the refrigerant supplied from the refrigerant pipe 64, and supplies the refrigerant to the refrigerant pipe 63.

The indoor heat exchanger 40 exchanges heat between the indoor air and the refrigerant. The indoor fan 400 is installed alongside the indoor heat exchanger 40 and sends the indoor air to the indoor heat exchanger 40.

The outdoor heat exchanger 50 exchanges heat between the refrigerant and outside air which is the outdoor air. The outdoor fan 500 is installed alongside the outdoor heat exchanger 50 and sends the outside air to the outdoor heat exchanger 50. Examples of the outdoor heat exchanger 50 include a fin tube type heat exchanger having a plurality of heat transfer pipes and a plurality of heat exchange fins.

The control device 300 controls the cooling operation and the heating operation of the air conditioner 100.

First, an operation of a normal operation will be described using an operation of the heating operation as an example. The compressor 10 sucks the refrigerant from the refrigerant pipe 66, compresses the sucked refrigerant, and discharges the compressed refrigerant to the refrigerant pipe 61. The control device 300 changes an operation frequency of the compressor 10 by outputting a control signal to the compressor 10. By changing the operation frequency of the compressor 10, a temperature and a pressure of the refrigerant discharged from the compressor 10 can be adjusted. The refrigerant compressed by the compressor 10 and discharged into the refrigerant pipe 61 flows into the refrigerant pipe 62 via the four-way valve 20, and then flows into the indoor heat exchanger 40.

The indoor heat exchanger 40 exchanges heat between the indoor air and the high-temperature high-pressure refrigerant compressed by the compressor 10. Through this heat exchange, the refrigerant is condensed and liquefied. The control device 300 changes a rotation speed of the indoor fan 400 by outputting a control signal to the indoor fan 400. By changing the rotation speed of the indoor fan 400, an amount of air sent to the indoor heat exchanger 40 can be changed, and an amount of heat exchanged between the refrigerant in the indoor heat exchanger 40 and the indoor air can be adjusted. The refrigerant condensed by the indoor heat exchanger 40 flows into the refrigerant pipe 63 and flows into the expansion valve 30.

The expansion valve 30 expands, by reducing the pressure of, the refrigerant condensed by the indoor heat exchanger 40. The control device 300 changes an opening degree of the expansion valve 30 by outputting a control signal to the expansion valve 30. By changing the opening degree of the expansion valve 30, a state of the refrigerant flowing out of the expansion valve 30 can be adjusted. Specifically, by increasing the opening degree of the expansion valve 30, the pressure of the refrigerant flowing out of the expansion valve 30 can be adjusted to increase, and a dryness degree of the refrigerant can be adjusted to decrease. The dryness degree of the refrigerant here is a ratio of saturated vapor contained in the refrigerant in a gas-liquid two-phase state. Further, by decreasing the opening degree of the expansion valve 30, the pressure of the refrigerant flowing out of the expansion valve 30 can be lowered, and the dryness degree of the refrigerant can be adjusted to increase. The refrigerant whose pressure has been reduced by the expansion valve 30 flows into the refrigerant pipe 64 and flows into the outdoor heat exchanger 50.

The outdoor heat exchanger 50 exchanges heat between the outside air and the refrigerant whose pressure has been reduced by the expansion valve 30. This heat exchange causes the refrigerant to evaporate into superheated steam. The control device 300 changes a rotation speed of the outdoor fan 500 by outputting a control signal to the outdoor fan 500. By changing the rotation speed of the outdoor fan 500, an amount of air sent to the outdoor heat exchanger 50 can be changed, and an amount of heat exchanged between the refrigerant in the outdoor heat exchanger 50 and the outside air can be adjusted. The refrigerant turned into the superheated steam by the outdoor heat exchanger 50 flows into the refrigerant pipe 65, flows into the refrigerant pipe 66 via the four-way valve 20, and flows into the compressor 10.

A refrigerating machine oil 600 for lubrication is sealed inside the compressor 10 to smooth movements of operating members. When the compressor 10 is operating, some of the refrigerating machine oil 600 flows out of the compressor 10. The refrigerating machine oil 600 that has flown out of the compressor 10 returns to the compressor 10 after circulating through the refrigeration cycle.

Figure 2:
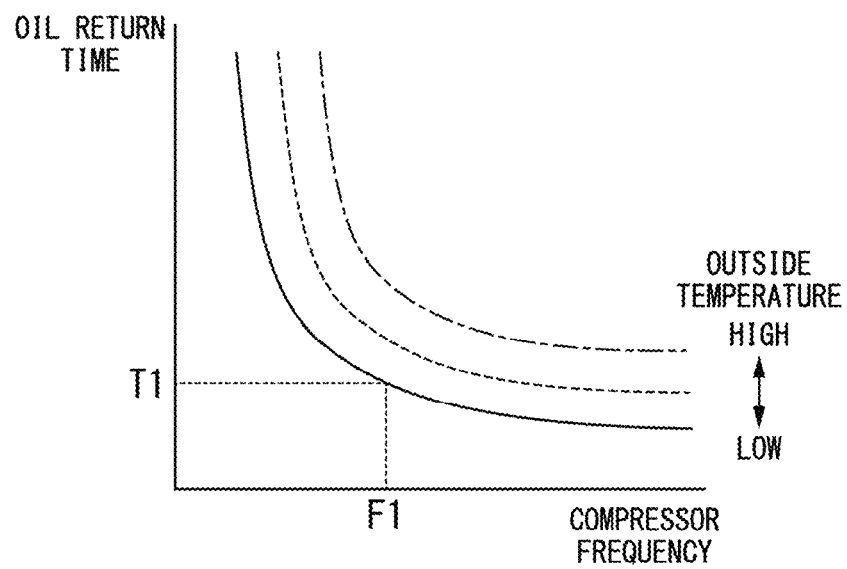
FIG. 2 is an image diagram showing a relationship between a compressor frequency and an oil return time according to the first embodiment.

FIG. 2 is an image diagram showing a relationship between an operation frequency of the compressor (compressor frequency) and an oil return time according to the first embodiment. A horizontal axis in FIG. 2 indicates the compressor frequency, and a vertical axis shows the oil return time. The oil return time is a time required for the refrigerating machine oil 600 that has flown out of the compressor 10 to return to the compressor 10 after circulating through the refrigeration cycle.

As shown in FIG. 2, the higher the compressor frequency, the shorter the time it takes for the refrigerating machine oil 600 to return to the compressor 10. On the other hand, the lower the compressor frequency, the slower a flow velocity of the oil flowing in the refrigerant pipes, and the longer it takes for the refrigerating machine oil 600 to return to the compressor 10. In other words, when the compressor frequency is low, the oil return time becomes longer and the oil return performance becomes worse than when the compressor frequency is high. For this reason, when the compressor frequency is low; the amount of the oil inside the compressor 10 decreases, resulting in an oil shortage so that the reliability of the compressor 10 may not be maintained.

Here, when the compressor 10 is started, the opening degree of the expansion valve 30 is controlled to be slightly open (high opening degree) due to problems such as low pressure drawing. For this reason, at the time when the compressor 10 is started, discharge SH=0 [deg]. The discharge SH here is a difference between a temperature of the refrigerant discharged from the compressor 10 (discharge temperature) and a condensation temperature of the refrigerant, that is, a discharge superheat degree.

It should be noted that in the operation where it becomes discharge SH=0 [deg], the refrigerant discharged from the compressor 10 is in a gas-liquid two-phase state. For this reason, in order to maintain the reliability of the compressor 10, it is desirable to promptly shift the operation to the operation where it becomes discharge SH>0 [deg] so that the operation where it becomes discharge SH>0 [deg] is continued.

When the compressor 10 is started, discharge SH=0 [deg]. Then, the operation is continued, and when it becomes discharge SH>0 [deg], the oil amount temporarily decreases significantly. This is because the refrigerant dissolved in the refrigerating machine oil 600 in the state where discharge SH=0 [deg] evaporates, and a large amount of the refrigerating machine oil 600 flows out of the discharge side of the compressor 10 into the refrigerant pipe 61 together with the refrigerant.

Particularly, when the compressor 10 is started in the state where the difference between the indoor temperature and the set temperature is not so large, the operation is started at a low compressor frequency. In this case, compared to the case where the compressor frequency is high, it takes more time until it becomes discharge SH>0 [deg]. This is because a time required to change the opening degree of the expansion valve 30 from a high opening degree to a low opening degree so as to make discharge SH>0 [deg] becomes longer than when the compressor frequency is high.

When the compressor 10 performs the intermittent operation, the operation is repeatedly performed in the state where discharge SH=0 [deg]. The intermittent operation here is an operation in which the short-term start and stop is repeated at a low compressor frequency. In the intermittent operation, since the operation is stopped after a short period of operation, it is considerable that the operation will be stopped before the state where discharge SH=0 [deg] when the compressor 10 is started shifts to the state where discharge SH>0 [deg]. For this reason, the operation in the state where discharge SH=0 [deg] continues without shifting to the state where discharge SH>0 [deg]. In the operation in the state where discharge SH=0 [deg], the refrigerant dissolved in the refrigerating machine oil 600 inside the compressor 10 does not evaporate. Further, the refrigerant that has circulated through the refrigerating cycle returns to the compressor 10, and some of the refrigerant dissolves in the refrigerating machine oil 600. As a result, if the operation in the state where discharge SH=0 [deg] continues, the oil concentration will decrease. The oil concentration is a ratio of the refrigerating machine oil 600 contained in the refrigerant inside the compressor 10.

Figure 3:
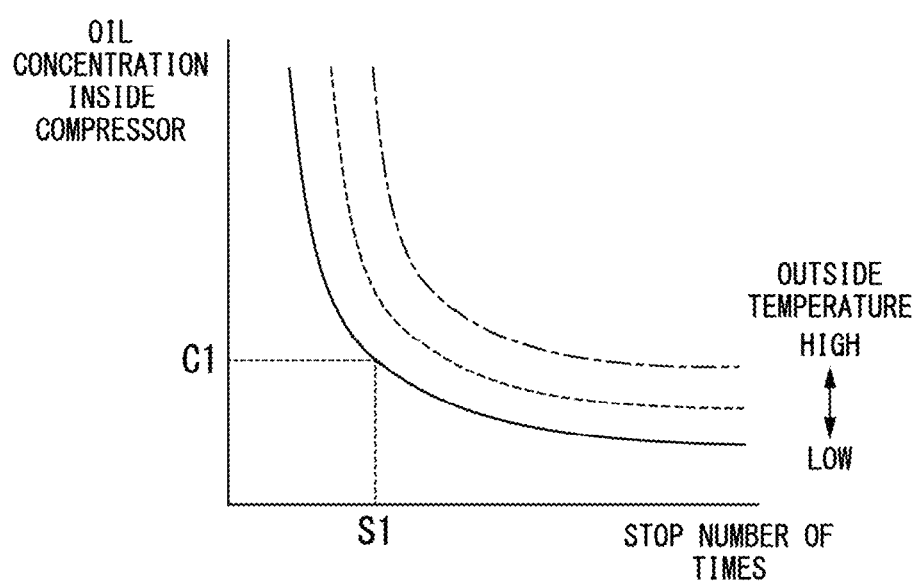
FIG. 3 is an image diagram showing a relationship between the number of times a compressor is stopped and an oil concentration inside the compressor according to the first embodiment.

FIG. 3 is an image diagram showing a relationship between the number of times the compressor is stopped and the oil concentration according to the first embodiment. A horizontal axis in FIG. 3 indicates the number of times the compressor is stopped, and a vertical axis indicates the oil concentration inside the compressor 10. As shown in FIG. 3, as the stop number of times increases, the oil concentration decreases.

A case where the compressor 10 is started after the intermittent operation is performed and the oil concentration inside the compressor 10 decreases is considered. In this case, if the operation of the compressor 10 is continued until it becomes discharge SH>0 [deg], a large amount of the refrigerant dissolved into the refrigerating machine oil 600 inside the compressor 10 evaporates at the time when it becomes discharge SH>0 [deg]. Then, a large amount of the refrigerating machine oil 600 flows out of the compressor 10 into the refrigerant pipe 61 together with the evaporated refrigerant. As a result, there is a possibility that the interior of the compressor 10 will run short of the oil, and the reliability of the compressor 10 cannot be maintained.

As a countermeasure for the above, in the present embodiment, a recovery operation is performed to recover the oil concentration inside the compressor 10. Hereinafter, a specific operation performed during the recovery operation will be described.

As shown in FIG. 1, the control device 300 includes an operation frequency detector 301, an operation time measurer 302, a stop counter 303, and an operation controller 304. The operation frequency detector 301 detects an operation frequency of the compressor 10. The operation time measurer 302 measures a continuous time based on a result of the detection by the operation frequency detector 301. The continuous time is a time for which a low frequency operation in which the operation frequency of the compressor 10 is lower than a reference frequency is continuously performed. The stop counter 303 counts the stop number of times based on a result of the measurement by the operation time measurer 302. The stop number of times is the number of times the compressor 10 is stopped without the continuous time continuing for a reference time or more. The operation controller 304 performs the recovery operation based on the stop number of times.

Figure 4:
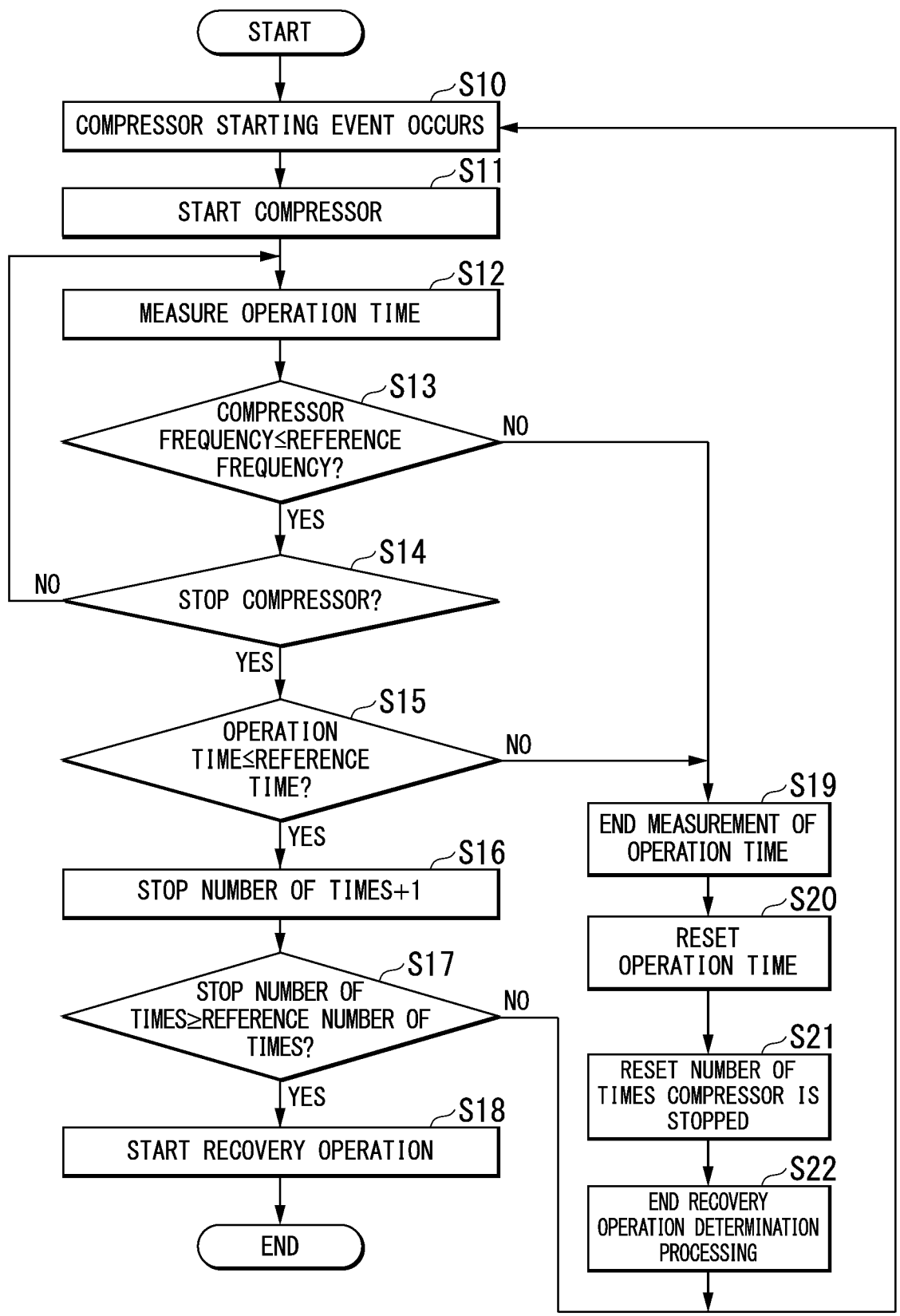
FIG. 4 is a flowchart showing a flow of processing performed by the air conditioner according to the first embodiment.

FIG. 4 is a flowchart showing a flow of processing performed by the air conditioner according to the first embodiment. FIG. 4 shows the flow of the processing for determining whether or not to perform the recovery operation.

First, when a compressor starting event occurs (step S10), the operation controller 304 starts the compressor 10 (step S11). The compressor starting event here is, for example, a case where a thermo-on condition is satisfied, or a case where the operation is started using a remote controller. The thermo-on condition is that the indoor temperature becomes higher than the set temperature during the cooling operation, and that the indoor temperature becomes lower than the set temperature during the heating operation.

The operation time measurer 302 measures an operation time (step S12). The operation time is a time for which an operation at a low frequency (low frequency operation) in which the compressor frequency is equal to or lower than the reference frequency is continued. The operation frequency detector 301 detects a compressor frequency when the compressor 10 is started. The operation frequency detector 301 outputs the detected compressor frequency to the operation time measurer 302. The operation time measurer 302 measures an operation time when the compressor frequency acquired from the operation frequency detector 301 is equal to or lower than the reference frequency. Then, the operation frequency detector 301 determines whether or not the compressor frequency is equal to or lower than the reference frequency (step S13). The operation frequency detector 301 detects a compressor frequency when the compressor 10 is started. The operation frequency detector 301 outputs the detected compressor frequency to the operation time measurer 302 and the operation controller 304.

If the compressor frequency acquired from the operation frequency detector 301 is higher than the reference frequency (step S13: No), the operation time measurer 302 stops measuring the operation time (step S19), and resets the operation time (step S20). Specifically, the stop counter 303 resets (clears) the operation time by setting the operation time to 0 (zero). Then, the stop counter 303 resets the number of times the compressor 10 is stopped (step S21). In other words, by setting the number of times the compressor 10 is stopped to 0 (zero), the stop number of times is reset (cleared). Then, the control device 300 ends the recovery operation determination processing (step S22), returns to the process shown in step S10, and waits until a compressor starting event occurs.

On the other hand, if the compressor frequency acquired from the operation frequency detector 301 is lower than the reference frequency (step S13: Yes), the operation controller 304 determines whether or not to stop the compressor 10 (step S14). The operation controller 304 stops the compressor 10, for example, when a thermo-off condition is satisfied, or when the operation is stopped using a remote control. The thermo-off condition is that the indoor temperature becomes lower than the set temperature during the cooling operation, and that the indoor temperature becomes higher than the set temperature during the heating operation. If the compressor 10 is not to be stopped (step S14: No), the operation controller 304 performs the process shown in step S12. On the other hand, when the compressor 10 is to be stopped (step S14: Yes), the operation controller 304 performs a process shown in step S15.

The operation time measurer 302 ends the measurement of the operation time when the compressor 10 is stopped. The operation time measurer 302 outputs the measured operation time to the stop counter 303.

The stop counter 303 determines whether or not the operation time acquired from the operation time measurer 302 is within the reference time (step S15). If the operation time is within the reference time (step S15: Yes), the stop counter 303 increments the stop number of times by 1 (step S16). The stop counter 303 outputs the stop number of times to the operation controller 304.

On the other hand, if the operation time is longer than the reference time (step S15: No), the control device 300 performs the processes shown in respective steps S19 to S22, then returns to the process shown in step S10, and waits until a compressor starting event occurs.

The operation controller 304 determines whether or not the stop number of times acquired from the stop counter 303 is equal to or greater than a reference number of times (step S17). If the stop number of times is equal to or greater than the reference number of times, that is, the stop number of times reaches the reference number of times (step S17: Yes), the operation controller 304 starts the recovery operation (step S18).

On the other hand, if the stop number of times is less than the reference number of times (step S17: No), the operation controller 304 returns to the process shown in step S10 and waits until a compressor starting event occurs.

Figure 5:
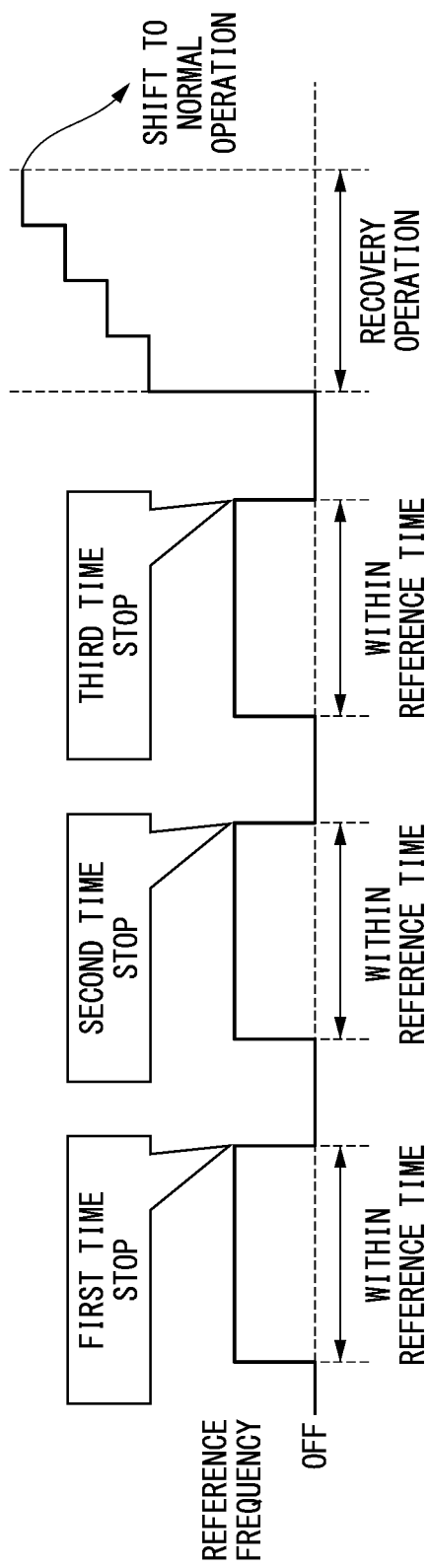
FIG. 5 is an image diagram of a recovery operation of the air conditioner according to the first embodiment.

FIG. 5 is an image diagram of the recovery operation of the air conditioner according to the first embodiment. As shown in FIG. 5, in the air conditioner 100 of the present embodiment, the recovery operation is performed when the stop number of times becomes equal to or greater than the reference number of times (three times in the example of this figure). In the recovery operation, the compressor 10 is operated at a higher compressor frequency than when operated at the low frequency. As a result, the refrigerating machine oil 600 that has flowed out of the compressor 10 is returned to the inside of the compressor 10, so that the oil concentration inside the compressor 10 is restored.

This figure shows an example of a case where the compressor 10 is stopped based on the stop number of times reaching the reference number of times (3 times), the compressor 10 is restarted, and then the operation controller 304 performs the recovery operation before the low frequency operation. In other words, in the case where the compressor 10 is restarted after the compressor 10 is stopped based on the stop number of times reaching the reference number of times (3 times), the operation controller 304 first performs the recovery operation, and after finishing the recovery operation, performs the low frequency operation.

Further, during the recovery operation, the operation controller 304 operates the compressor 10 at a higher frequency than the operation frequency at which the compressor 10 has been operated before the recovery operation is performed. This figure shows an example of a case where the compressor 10 is operated by increasing the compressor frequency stepwise during the recovery operation.

Here, a method for determining the reference frequency, the reference time, and the reference number of times in the present embodiment will be described.

As shown in FIG. 2, the oil return time changes depending on the compressor frequency and the outside temperature. Generally, the lower the outside temperature, the longer the time required for the oil to return tends to be. Further, when the flow velocity of the refrigerant flowing inside the refrigerant pipes 6 is high, the refrigerating machine oil 600 also rises along with the flow of the refrigerant, and when the flow velocity of the refrigerant decreases, the refrigerating machine oil 600 descends along a pipe wall. That is, when the flow velocity of the refrigerant flowing inside the refrigerant pipes 6 is high, it becomes possible to raise the oil that has descended and adhered along the inner walls of the refrigerant pipes 6 when the outside temperature is low. For this reason, a compressor frequency corresponding to a velocity greater than a zero penetration velocity when the outside temperature is low is set as the "reference frequency."

The zero penetration velocity is a flow velocity of the refrigerant at which the flow velocity of the refrigerant increases and the phenomenon in which the refrigerating machine oil 600 descends along the inner walls of the refrigerant pipes 6 is reduced. In the example of FIG. 2, a compressor frequency F1 corresponds to a zero penetration frequency. The zero penetration frequency is a frequency that corresponds to a velocity greater than the zero penetration velocity. Then, based on the correspondence relationship shown in FIG. 2, an oil return time T1 corresponding to the compressor frequency F1 is determined.

Figure 6:
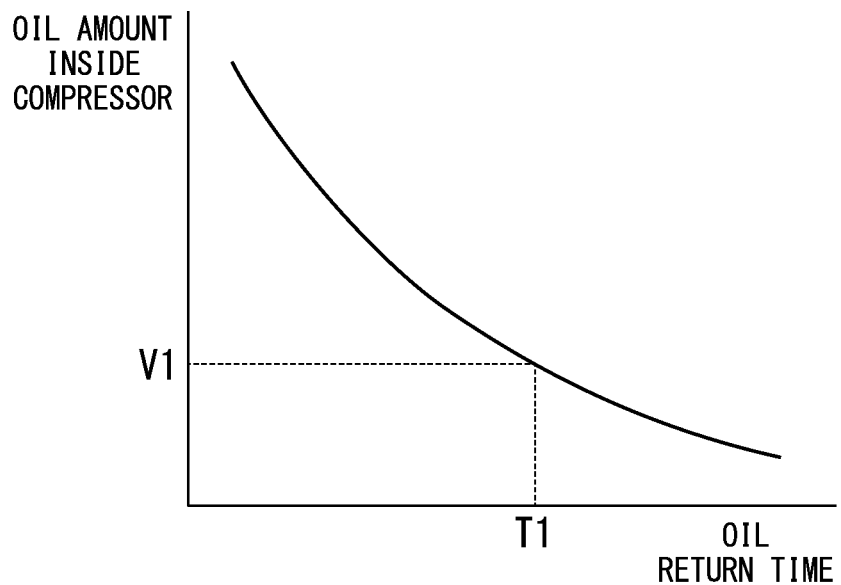
FIG. 6 is an image diagram showing a relationship between the oil return time and an oil amount inside the compressor of the air conditioner according to the first embodiment.

FIG. 6 is an image diagram showing a relationship between the oil return time and an oil amount inside the compressor of the air conditioner according to the first embodiment. A horizontal axis in FIG. 6 indicates the oil return time, and a vertical axis indicates an amount of the refrigerating machine oil 600 inside the compressor 10. Even if the refrigerating machine oil 600 flows out of the compressor 10 while the compressor 10 is in operation, as long as the refrigerating machine oil 600 returns to the compressor 10 before the amount of the oil inside the compressor 10 falls below a lower limit, the reliability of the compressor 10 can be maintained. For this reason, a relationship between the oil return time and the amount of the refrigerating machine oil 600 inside the compressor 10 is a downward-sloping relationship, as shown in FIG. 6. Based on FIG. 2, the oil return time T1 corresponding to the compressor frequency F1 is determined. Then, based on FIG. 6, an oil amount V1 inside the compressor 10 corresponding to the oil return time T1 is determined. It is desirable to confirm by testing or the like that the oil amount V1 determined in this way does not fall below the lower limit of the oil amount necessary to maintain the reliability of the compressor 10.

Figure 7:
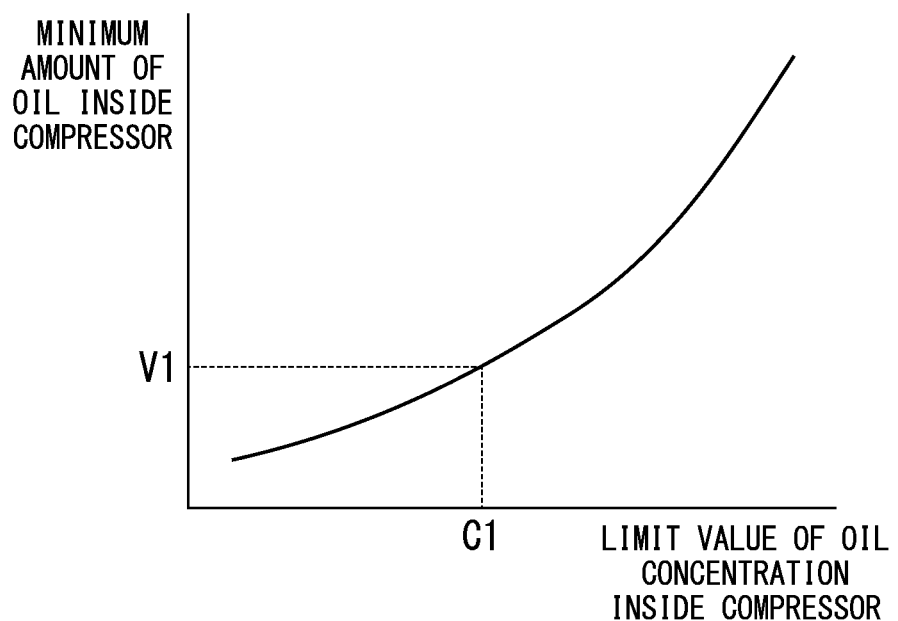
FIG. 7 is an image diagram showing a relationship between the oil concentration and the oil amount inside the compressor of the air conditioner according to the first embodiment.

FIG. 7 is an image diagram showing a relationship between the oil concentration and the oil amount inside the compressor according to the first embodiment. FIG. 7 shows a relationship between a limit value of the oil concentration inside the compressor 10 and a minimum amount of the oil remaining inside the compressor 10 when the operation of the compressor 10 shifts from the state where discharge SH=0 [deg] to the state where discharge SH>0 [deg]. A horizontal axis of FIG. 7 indicates the oil concentration inside the compressor 10, and a vertical axis indicates the amount of the oil remaining inside the compressor 10. As shown in FIG. 7, the higher the oil concentration, the smaller the amount of the oil flowing out of the compressor 10 when the state shifts to the state where discharge SH>0 [deg]. The lower the oil concentration, the larger the amount of the oil flowing out of the compressor 10 when the state shifts to the state where discharge SH>0 [deg]. Based on FIG. 7, an oil concentration C1 corresponding to the oil amount V1 of the refrigerating machine oil 600 inside the compressor 10 is determined. The oil amount V1 here is the oil amount which is determined based on FIG. 6 and which does not fall below the lower limit of the oil amount necessary to maintain the reliability of the compressor 10.

Figure 8:
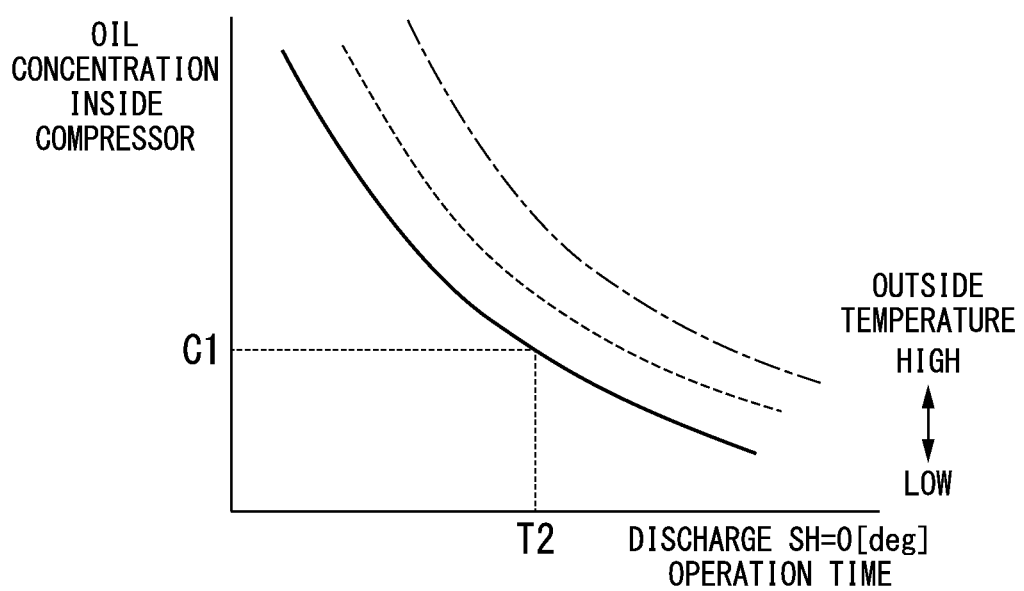
FIG. 8 is an image diagram showing an example of a relationship between an operation time in a state where discharge SH=0 [deg] and the oil concentration inside the compressor of the air conditioner according to the first embodiment.

FIG. 8 is an image diagram showing a relationship between the oil concentration inside the compressor and an operation time for which the operation has been continued in the state where discharge SH=0 [deg]. A horizontal axis in FIG. 8 indicates the operation time, and a vertical axis indicates the oil concentration inside the compressor 10. As shown in FIG. 8, the longer the operation is continued in the state where discharge SH=0 [deg], the more the refrigerant dissolves in the refrigerating machine oil 600 inside the compressor 10 and the oil concentration decreases. As described with respect to FIG. 7, the oil amount V1 of the refrigerating machine oil 600 inside the compressor 10 is the oil amount that does not fall below the lower limit of the oil amount that can maintain the reliability of the compressor 10. Further, the oil concentration C1 is an oil concentration corresponding to the oil amount V1, which is the oil concentration that does not fall below the lower limit of the oil concentration which can maintain the reliability of the compressor 10. Based on FIG. 8, an operation time T2 corresponding to the oil concentration C1 is determined. The operation time T2 determined in this way is set as the "reference time."

As described with respect to FIG. 3, the oil concentration decreases as the stop number of times increases. Further, as described with respect to FIG. 7, as the oil concentration decreases, the oil amount inside the compressor 10 when it becomes discharge SH>0 [deg] decreases. Based on this relationship, the stop number of times SI corresponding to the oil concentration C1, which is the oil concentration that does not fall below the lower limit of the oil concentration that can maintain the reliability of the compressor 10, is set as the "reference number of times."

Here, the recovery operation will be described. In the present embodiment, the operation controller 304 performs the recovery operation in the case where the compressor 10 is restarted after the compressor 10 is stopped based on the number of times the compressor is stopped reaching the reference number of times.

The operation controller 304 performs the recovery operation by performing a control different from the control performed on the compressor 10 during the normal heating or cooling operation. The operation controller 304 sets a plurality of operating frequencies used for the recovery operation and a plurality of operation times for the respective operation frequencies. For example, as shown in FIG. 5, the operation controller 304 perform the recovery operation by performing the operation for the operation time corresponding to each operation frequency from the lowest frequency to the highest frequency among the plurality of frequencies for the recovery operation, and stepwise increasing the compressor frequency. By stepwise increasing the compressor frequency, it is possible to suppress the occurrence of failures in the operating members of the compressor 10, compared to the case where the frequency is increased all at once.

Alternatively, the operation controller 304 may perform the recovery operation by temporarily increasing the compressor frequency, performing the operation at the highest frequency among the plurality of frequencies for the recovery operation, and stepwise decreasing the compressor frequency. By increasing the compressor frequency all at once, the oil concentration inside the compressor 10 can be restored quickly.

In addition, although FIG. 5 shows the example of the case where the compressor frequency is stepwise increased in four stages during the recovery operation, the number of stages is not limited thereto and may be set arbitrarily. As shown in FIG. 2, generally, by operating the compressor 10 at a high frequency, the oil return time can be shortened and the oil return speed can be increased. For this reason, during the recovery operation, a period of time is provided for which the compressor 10 is operated at a higher frequency than at least the compressor frequency during the intermittent operation.

Further, if the compressor 10 is stopped due to a thermo-off condition being satisfied or the like during the recovery operation, it becomes difficult to recover the oil concentration. For this reason, the operation controller 304 may forcibly continue the operation of the compressor 10 during the recovery operation without stopping the operation.

As explained above, the air conditioner 100 according to the first embodiment is an air conditioner having a refrigeration cycle in which a refrigerant circulates through the compressor 10, the indoor heat exchanger 40, the expansion valve 30, and the outdoor heat exchanger 50, which are connected by the refrigerant pipes 6 (refrigerant pipes 61 to 66). A refrigerating machine oil is sealed inside the compressor 10. The air conditioner 100 includes the operation frequency detector 301, the operation time measurer 302, the stop counter 303, and the operation controller 304. The operation frequency detector 301 is configured to detect an operation frequency of the compressor 10. The operation time measurer 302 is configured to measure a continuous time for which an operation is continuously performed at the operation frequency of the compressor 10 equal to or lower than a reference frequency. The stop counter 303 is configured to count a stop number of times the compressor 10 is stopped without the operation time of the compressor 10 continuing longer than a reference operation time. The operation controller 304 is configured to perform a recovery operation based on the stop number of times. The recovery operation is an operation for recovering an oil concentration inside the compressor 10.

As a result, the air conditioner 100 according to the first embodiment performs the intermittent operation, and can perform the recovery operation when the oil concentration inside the compressor 10 decreases. Therefore, the oil concentration inside the compressor 10 can be restored before the oil concentration inside the compressor 10 decreases to the level where the reliability of the compressor 10 can no longer be maintained. Accordingly, it is possible to prevent a decrease in the oil amount inside the compressor 10 and maintain the reliability of the compressor 10.

Further, in the air conditioner 100 of the first embodiment, the operation time measurer 302 is configured to stop measuring the continuous time in a case that the operation frequency of the compressor 10 is higher than the reference frequency, or in a case that the operation time (continuous time), for which the operation is continuously performed at the operation frequency of the compressor 10 equal to or lower than the reference operation frequency, continues longer than the reference time. The operation time measurer 302 is configured to stop measuring the continuous time and clear the continuous time by setting the continuous time to 0 (zero).

Further, in the air conditioner 100 of the first embodiment, the stop counter 303 is configured to clear the stop number of times in a case that the operation frequency of the compressor 10 exceeds the reference frequency, or in a case that the operation time (continuous time), for which the operation is continued at the operation frequency of the compressor 10 equal to or lower than the reference operation frequency, continues longer than the reference operation time. In other words, the stop counter 303 is configured to clear the stop number of times by setting the stop number of times to 0 (zero).

Here, the recovery operation is an operation for resolving the shortage of the refrigerating machine oil in the compressor 10, and is not necessarily a comfortable operation for users, and may be an unpleasant operation in some cases. For example, at the timing when the operation is normally stopped based on the difference between the room temperature and the set temperature disappearing, the recovery operation is performed at a high compressor frequency in order to resolve the shortage of the refrigerating machine oil in the compressor 10. As a result, the room temperature may fall below the set temperature and the room becomes too cold during the cooling operation, while the room temperature may exceed the set temperature and the room becomes too warm during the heating operation, so that the recovery operation may be uncomfortable for users in some cases.

As a countermeasure for this, in the present embodiment, the measured continuous time and the counted stop number of times are cleared when a specific condition is satisfied. The specific condition is a condition under which the shortage of the refrigerating machine oil in the compressor 10 can be improved. For example, the specific condition includes at least one of the condition that the operation frequency of the compressor 10 exceeds the reference frequency and the condition that the continuous time continues longer than the reference time. As a result, in the present embodiment, the frequency of the performance of the recovery operation, which may be uncomfortable for users, can be suppressed as much as possible. Furthermore, by setting, as the specific condition, a condition under which the shortage of the refrigerating machine oil in the compressor 10 can be improved, it is possible to suppress the frequency of the recovery operation so that the shortage of the refrigerating machine oil in the compressor 10 does not become more serious. Accordingly, it is possible to prevent the shortage of the refrigerating machine oil inside the compressor and control the air conditioner so as to provide comfort to users.

Note that the above-described embodiment has been described with respect to the example of the case where the stop number of times is cleared by setting the stop number of times to 0 (zero), but the embodiment is not limited to this. For example, when the continuous time continues longer than the reference time, the stop number of times may be decremented according to the length of the continued time. Alternatively, when the operation frequency of the compressor 10 exceeds the reference frequency, the stop number of times may be decremented according to the magnitude of the operation frequency. As a result, it is possible to suppress the frequency of the recovery operation according to the extent to which the shortage of the refrigerating machine oil in the compressor 10 is improved.

Further, in the air conditioner 100 of the first embodiment, the operation controller 304 is configured to, in a case of restarting the compressor 10 after stopping the compressor 10 based on the stop number of times reaching a reference number of times, perform the recovery operation before controlling the compressor 10 to perform the low frequency operation. As a result, in the first embodiment, when the oil concentration inside the compressor 10 decreases, the recovery operation can be performed at the earliest timing on or after the compressor 10 is restarted.

Further, in the air conditioner 100 of the first embodiment, the operation controller 304 is configured to control the operation frequency of the compressor in the recovery operation so that there is at least a period of time for which the compressor is operated at a frequency higher than the operation frequency at which the compressor has been operated before the recovery operation is performed. As a result, the air conditioner 100 of the present embodiment performs the recovery operation, thereby shortening the oil return time of the refrigerating machine oil 600, so that the shortage of oil inside the compressor 10 can be resolved.

Further, in the air conditioner 100 of the first embodiment, the operation controller 304 is configured to not stop the operation of the compressor 10 during the recovery operation. As a result, it is possible to prevent the compressor 10 from being stopped even when a thermo-off condition is satisfied during the recovery operation. Accordingly, it is possible to prevent a situation in which it becomes difficult to recover the oil concentration.

Second Embodiment

Figure 9:
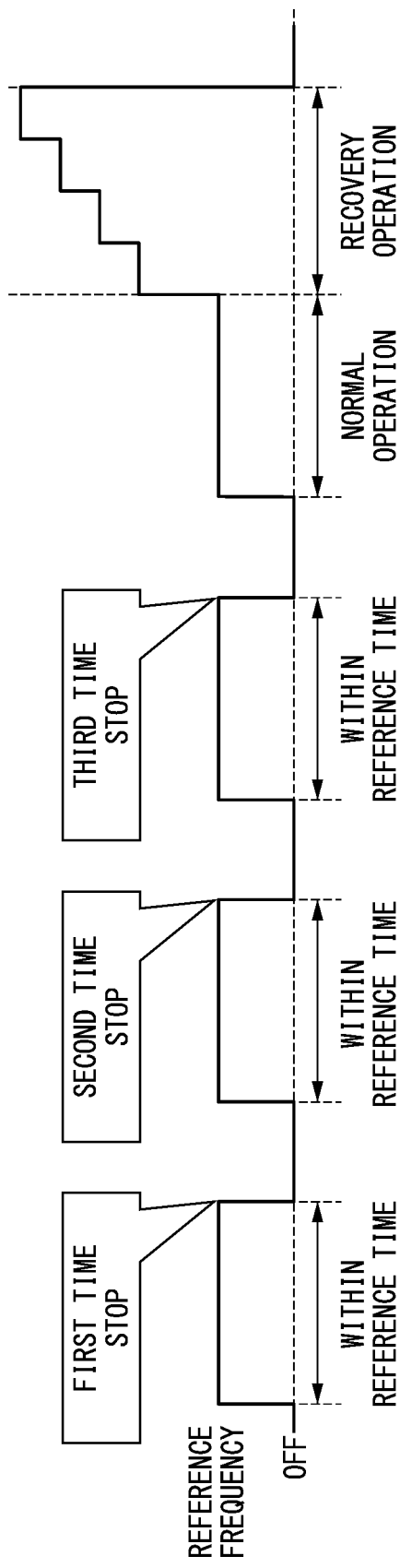
FIG. 9 is an image diagram of a recovery operation of an air conditioner according to a second embodiment.

FIG. 9 is an image diagram of a recovery operation of an air conditioner according to a second embodiment. As shown in FIG. 9, in the present embodiment, a condition for performing the recovery operation, and an operation frequency and an operation time of the compressor 10 in the recovery operation are the same as those in the above-described first embodiment.

In the present embodiment, a timing at which the operation controller 304 causes the compressor 10 to start the recovery operation is different from that in the above-described first embodiment. Specifically, in a case where the operation controller 304 restarts the compressor 10 after stopping the compressor 10 based on the number of times the compressor 10 is stopped reaching the reference number of times, the operation controller 304 first performs the normal operation. Then, in a case of stopping the compressor 10 based on a thermo-off condition being satisfied or the like during the normal operation, the operation controller 304 performs the recovery operation before stopping the compressor 10.

As described above, in the air conditioner 100 of the second embodiment, the operation controller 304 stops the compressor 10 when the stop number of times reaches the reference number of times. Thereafter, when the compressor 10 is restarted, the compressor is first operated at a low frequency. Then, in a case where the compressor 10 is stopped based on a thermo-off condition being satisfied or the like while the compressor 10 is being operated at the low frequency, the recovery operation is performed before the compressor 10 is stopped.

As a result, in the second embodiment, the same effects as in the first embodiment can be achieved. Further, in the second embodiment, when the oil concentration inside the compressor 10 decreases, the normal operation is first performed, and after the room temperature is adjusted to an appropriate temperature, the recovery operation can be performed. Accordingly, a control can be performed so as to maintain the comfort of the space.

Modified Examples of Embodiments

In at least one of the embodiments described above, plural combinations of the reference frequency, the reference time, and the reference number of times may be set.

As described above, the setting condition is to set, as the reference frequency, a compressor frequency corresponding to a velocity greater than at least the zero penetration velocity. For example, two reference frequencies, a first reference frequency and a second reference frequency, are set within a range that satisfies this setting condition. Here, the first reference frequency is a higher frequency than the second reference frequency.

For example, a reference time (referred to as first reference time) and a reference number of times (referred to as first reference number of times) which correspond to the first reference frequency are determined by the determination method of the above-described embodiment. In other words, a first oil return time is determined based on the first reference frequency and FIG. 2. A first oil amount is determined based on the first oil return time and FIG. 6. A first oil concentration is determined based on the first oil amount and FIG. 7. Then, a first operation time is determined based on the first oil concentration and FIG. 8, and this first operation time is set as the "first reference time." Further, a first stop number of times is determined based on the first oil concentration and FIG. 3, and this first stop number of times is determined as the "first reference number of times."

Further, a reference time (referred to as second reference time) and a reference number of times (referred to as second reference number of times) which correspond to the second reference frequency are derived by the determination method of the above-described embodiment. Then, when the second reference number of times is derived to be the same as the first reference number of times, the second reference number of times is changed to be less than the first reference number of times.

When the intermittent operation is performed at a low compressor frequency, the oil concentration inside the compressor 10 decreases to a greater extent than when the compressor frequency is high. By setting the second reference number of times to be less than the first reference number of times, when the intermittent operation is performed at a low compressor frequency, the recovery operation can be performed at an earlier point in time than when the compressor frequency is high. It is possible to prevent the oil amount from decreasing and maintain the reliability of the compressor 10.

Alternatively, if the second reference number of times is derived to be the same as the first reference number of times, the second reference number of times may be set to the same as the first reference number of times, and the operation frequency of the compressor in the recovery operation may be set to a higher frequency than the operation frequency applied when the recovery operation is performed according to the first reference frequency. When the intermittent operation is performed at a low compressor frequency, the oil concentration inside the compressor 10 decreases to a greater extent than when the compressor frequency is high. In the recovery operation, by setting the operation frequency of the compressor in the recovery operation to a higher frequency than the operation frequency applied when the recovery operation is performed according to the first reference frequency, it is possible to return a larger amount of oil to the compressor 10 and maintain the reliability of the compressor 10.

Note that the air conditioner 100 described above has a computer system inside. Additionally, the process steps of the above-described processing are stored in a computer-readable recording medium in the form of a program, and the above-described processing is performed by a computer reading and executing this program. Here, the computer-readable recording medium refers to magnetic disks, magneto-optical disks, CD-ROMs, DVD-ROMs, semiconductor memories, and the like. Alternatively, the computer program may be distributed to a computer via a communication line, and the computer receiving the distribution may execute the program.

The invention claimed is:

1. An air conditioner having a refrigeration cycle in which a refrigerant circulates through a compressor, an indoor heat exchanger, an expansion valve, and an outdoor heat exchanger which are connected by a pipe, the air conditioner comprising:
   an operation frequency detector configured to detect an operation frequency of the compressor;
   an operation time measurer configured to, based on a result of the detection by the operation frequency detector, measure a continuous time for which a low frequency operation in which the operation frequency of the compressor is equal to or lower than a reference frequency is continuously performed;
   a stop counter configured to, based on a result of the measurement by the operation time measurer, count a stop number of times the compressor is stopped without the continuous time continuing longer than a reference time; and an operation controller configured to, based on the stop number of times, perform a recovery operation that recovers a concentration of a refrigerating machine oil sealed inside the compressor, wherein the operation time measurer is configured to clear the continuous time in a case that an operation that can improve a shortage of the refrigerating machine oil in the compressor is performed in a period from a start of the measurement of the continuous time to the performance of the recovery operation, and the operation controller is configured to
stop the compressor based on the stop number of times reaching a reference number of times;
restart the compressor after stopping the compressor;
control the compressor to perform the low frequency operation after restarting the compressor;
perform the recovery operation after the low frequency operation; and
stop the compressor after the recovery operation.

2. The air conditioner of claim 1, wherein
the operation time measurer is configured to stop measuring the continuous time and clear the continuous time, based on determining that the operation that can improve the shortage of the refrigerating machine oil in the compressor is performed, in a case that the operation frequency of the compressor is higher than the reference frequency, or in a case that the continuous time continues longer than the reference time.

3. The air conditioner of claim 1, wherein
the stop counter is configured to clear the stop number of times in a case that the operation frequency of the compressor exceeds the reference frequency, or in a case that the continuous time continues longer than the reference time.

4. The air conditioner of claim 1, wherein
the operation controller is configured to
stop the compressor based on the stop number of times reaching a reference number of times;
restart the compressor after stopping the compressor;
perform the recovery operation after restarting the compressor; and
control the compressor to perform the low frequency operation after the recovery operation.

5. The air conditioner of claim 1, wherein
the operation controller is configured to control the operation frequency of the compressor in the recovery operation so that there is at least a period of time for which the compressor is operated at a frequency higher than the operation frequency at which the compressor has been operated before the recovery operation is performed.

6. The air conditioner of claim 1, wherein
the operation controller is configured to not stop the operation of the compressor during the recovery operation.

7. A control method performed by an air conditioner, the control method comprising:
detecting an operation frequency of a compressor included in the air conditioner;
based on a result of detecting the operation frequency, measuring a continuous time for which a low frequency operation in which the operation frequency of the compressor is equal to or lower than a reference frequency is continuously performed;
based on a result of measuring the continuous time, counting a stop number of times the compressor is stopped without the continuous time continuing longer than a reference time;
based on the stop number of times, performing a recovery operation that recovers a concentration of a refrigerating machine oil sealed inside the compressor;
clearing the continuous time in a case that an operation that can improve a shortage of the refrigerating machine oil in the compressor is performed in a period from a start of the measurement of the continuous time to the performance of the recovery operation;
stopping the compressor based on the stop number of times reaching a reference number of times;
restarting the compressor after stopping the compressor;
controlling the compressor to perform the low frequency operation after restarting the compressor;
performing the recovery operation after the low frequency operation; and
stopping the compressor after the recovery operation.

8. The control method of claim 7, further comprising:
stopping measuring the continuous time and clearing the continuous time, based on determining that the operation that can improve the shortage of the refrigerating machine oil in the compressor is performed, in a case that the operation frequency of the compressor is higher than the reference frequency, or in a case that the continuous time continues longer than the reference time.

9. The control method of claim 7, further comprising:
clearing the stop number of times in a case that the operation frequency of the compressor exceeds the reference frequency, or in a case that the continuous time continues longer than the reference time.

10. The control method of claim 7, further comprising:
stopping the compressor based on the stop number of times reaching a reference number of times;
restarting the compressor after stopping the compressor;
performing the recovery operation after restarting the compressor; and
controlling the compressor to perform the low frequency operation after the recovery operation.

11. The control method of claim 7, further comprising:
controlling the operation frequency of the compressor in the recovery operation so that there is at least a period of time for which the compressor is operated at a frequency higher than the operation frequency at which the compressor has been operated before the recovery operation is performed.

12. The control method of claim 7, further comprising:
not stopping the operation of the compressor during the recovery operation.

13. A non-transitory computer-readable recording medium storing a program causing a control device included in an air conditioner to:
detect an operation frequency of a compressor included in the air conditioner;
based on a result of detecting the operation frequency, measure a continuous time for which a low frequency operation in which the operation frequency of the compressor is equal to or lower than a reference frequency is continuously performed;

based on a result of measuring the continuous time, count a stop number of times the compressor is stopped without the continuous time continuing longer than a reference time;

based on the stop number of times, perform a recovery operation that recovers a concentration of a refrigerating machine oil sealed inside the compressor;

clear the continuous time in a case that an operation that can improve a shortage of the refrigerating machine oil in the compressor is performed in a period from a start of the measurement of the continuous time to the performance of the recovery operation;

stop the compressor based on the stop number of times reaching a reference number of times;

restart the compressor after stopping the compressor;

control the compressor to perform the low frequency operation after restarting the compressor;

perform the recovery operation after the low frequency operation; and stop the compressor after the recovery operation.

14. The non-transitory computer-readable recording medium of claim 13, wherein the program further causes the control device to:

stop measuring the continuous time and clear the continuous time, based on determining that the operation that can improve the shortage of the refrigerating machine oil in the compressor is performed, in a case that the operation frequency of the compressor is higher than the reference frequency, or in a case that the continuous time continues longer than the reference time.

15. The non-transitory computer-readable recording medium of claim 13, wherein the program further causes the control device to:

clear the stop number of times in a case that the operation frequency of the compressor exceeds the reference frequency, or in a case that the continuous time continues longer than the reference time.

16. The non-transitory computer-readable recording medium of claim 13, wherein the program further causes the control device to:

stop the compressor based on the stop number of times reaching a reference number of times;

restart the compressor after stopping the compressor;

perform the recovery operation after restarting the compressor; and control the compressor to perform the low frequency operation after the recovery operation.

17. The non-transitory computer-readable recording medium of claim 13, wherein the program further causes the control device to:

control the operation frequency of the compressor in the recovery operation so that there is at least a period of time for which the compressor is operated at a frequency higher than the operation frequency at which the compressor has been operated before the recovery operation is performed.

* * * * *